United States Patent [19]

Blöchl et al.

[11] Patent Number: 4,668,450

[45] Date of Patent: May 26, 1987

[54] METHOD FOR THE PRODUCTION OF INSCRIBED KEYS

[75] Inventors: Franz Blöchl; Jürgen Reuschel, both of Bocholt, Fed. Rep. of Germany

[73] Assignee: Siemens Aktiengesellschaft, Berlin and Munich, Fed. Rep. of Germany

[21] Appl. No.: 800,492

[22] Filed: Nov. 21, 1985

[30] Foreign Application Priority Data

Nov. 29, 1984 [DE] Fed. Rep. of Germany ....... 3443585

[51] Int. Cl.4 ............................................. B29C 71/02
[52] U.S. Cl. .................................. 264/25; 264/132; 264/245; 427/43.1; 427/53.1; 430/270
[58] Field of Search ...................... 264/25, 22, 80, 73, 264/132, 245, DIG. 46, 246–247, 293; 427/53.1, 43.1; 430/270

[56] References Cited

U.S. PATENT DOCUMENTS

| | | | |
|---|---|---|---|
| 1,781,071 | 11/1930 | Moyle | 400/92 |
| 3,651,191 | 3/1972 | Glatt et al. | 264/132 |
| 4,013,747 | 3/1977 | Hampel | 264/73 |
| 4,307,047 | 12/1981 | Edinger et al. | 264/25 |
| 4,391,764 | 7/1983 | Edinger et al. | 264/25 |
| 4,443,392 | 4/1984 | Becker et al. | 264/132 |
| 4,460,534 | 7/1984 | Boehm et al. | 264/246 |

FOREIGN PATENT DOCUMENTS

| | | | |
|---|---|---|---|
| 2132415 | 1/1973 | Fed. Rep. of Germany . | |
| 2518801 | 11/1976 | Fed. Rep. of Germany . | |
| 2936926 | 4/1981 | Fed. Rep. of Germany | 264/22 |
| 2483330 | 12/1981 | France . | |
| 60-4036 | 1/1985 | Japan | 264/22 |

Primary Examiner—Jeffery Thurlow
Attorney, Agent, or Firm—Mark H. Jay

[57] ABSTRACT

The invention facilitates application of light colored inscriptions of arbitrary size on a dark colored key body, the key body consists of a dark colored base component and a light colored component which bears the inscription, which are produced by two-color injection. The light colored component which bears the inscription is then darkened by thermal diffusion, with the exception of the inscription.

1 Claim, 2 Drawing Figures

METHOD FOR THE PRODUCTION OF INSCRIBED KEYS

BACKGROUND OF THE INVENTION

It is known to inscribe keys by two-color injection moulding. In this method the inscription is injection moulded in a first step, and the key body which encases the inscription is injection moulded in a following process step. In order to facilitate satisfactory injection moulding, the inscription should not fall below specified minimum dimensions. Since special and expensive injection moulds are required for each inscription to produce keys in accordance with this method, this method can be economically employed only for large production runs.

It is also known to apply dark colored graphic symbols to light colored keys by means of thermal diffusion. In this method the appropriate color is first applied to the key body and is then caused to penetrate into the key body by intensive short-term heat treatment. This method is unsuitable for light colored inscriptions on a dark colored key body. The reason is that after the application of the light color and subsequent heating, the light color penetrates into the dark colored key body in such manner that the contours of the inscription become undetectable or unclear.

One object of the invention is to apply light colored inscriptions of arbitrary sizes to dark colored key bodies.

SUMMARY OF THE INVENTION

In accordance with the invention, the key body comprises a dark colored base component and a light colored component which bears the inscription. These are produced by two-color injection moulding, and the light colored component which bears the inscription is colored dark, with the exception of the inscription, by means of thermal diffusion.

This combination of two known methods permits the production of dark colored keys bearing graphic characters of arbitary size. If inscriptions which merely correspond in color to the light colored component are to be produced, the thickness of these inscriptions corresponds to that of the light colored component. If, however, inscriptions whose color differs from that of the light colored component are to be produced on a dark colored background, these colors, for example yellow or red, penetrate into the light colored component as a result of the thermal diffusion to such an extent that they can no longer be rubbed off. Here the color of the light colored component can be offset from that of the base component for example in such manner as to form a peripheral border. This method can also be used to economically produce short production runs of keys which are to be provided with special inscriptions, and in this case it is merely necessary to leave blank the inscription on the key.

BRIEF DESCRIPTION OF THE DRAWINGS

Exemplary and non-limiting preferred embodiments of the invention are shown in the drawings, in which.

DETAILED DESCRIPTION OF PREFERRED EMBODIMENTS

Figure 1:
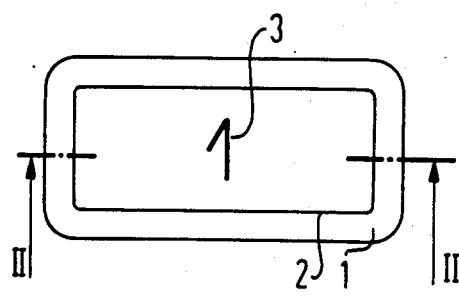
FIG. 1 is a plan view of an inscribed key in accordance with a preferred embodiment of the invention.
Figure 2:
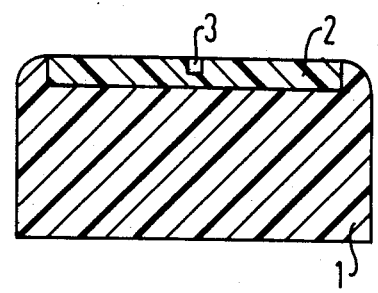
FIG. 2 is a section through the key corresponding to the sectional line II—II.

The illustrated key consists of a black base component 1 and a light component 2 which bears the inscription 3. The production of this key and the application of the inscription are advantageously carried out as follows:

The black base component 1 and the white component 2, which is integrally connected to the black base component 1, are first produced by the two-color injection moulding method. The color, which can correspond to the color of the base component 1, is then applied via a carrier, e.g. a silicon ram, to the white component 2, with the exception of the inscription 3. Then, by means of a short-term intensive heat treatment (170° to 180° C.), a diffusion process is initiated by which the dark color diffuses into the light component 2. In the event that the color applied to the light component 2 is identical to the color of the base component 1, a key is produced having a black background and a white inscription.

Those skilled in the art will understand that changes can be made in the preferred embodiments have described, and that these embodiments can be used for other purposes. Such changes and uses are within the scope of the invention, which is limited only by the claims which follow.

What is claimed is:

1. A method for producing inscribed keys, comprising the following steps performed in order:
   producing a dark colored base component and a light colored inscription-bearing component by two-color injection molding; and
   subjecting all parts of the light-colored inscription-bearing component except the inscription to thermal diffusion, whereby the light colored inscription-bearing component is darkened, with the inscription remaining undarkened.

* * * * *